United States Patent
Sasaoka et al.

(10) Patent No.: US 9,601,772 B2
(45) Date of Patent: Mar. 21, 2017

(54) CATHODE ACTIVE MATERIAL FOR A NONAQUEOUS ELECTROLYTE SECONDARY BATTERY AND MANUFACTURING METHOD THEREOF, AND A NONAQUEOUS ELECTROLYTE SECONDARY BATTERY THAT USES CATHODE ACTIVE MATERIAL

(75) Inventors: Hideo Sasaoka, Niihama (JP); Ryuuichi Kuzuo, Niihama (JP); Atsushi Fukui, Niihama (JP); Mitsukuni Kondou, Niihama (JP); Shin Imaizumi, Niihama (JP); Kensuke Nakura, Moriguchi (JP); Shuji Tsutsumi, Moriguchi (JP)

(73) Assignees: SUMITOMO METAL MINING CO. LTD., Tokyo (JP); MATSUSHITA ELECTRIC INDUSTRIAL CO., LTD., Osaka (JP)

( * ) Notice: Subject to any disclaimer, the term of this patent is extended or adjusted under 35 U.S.C. 154(b) by 828 days.

(21) Appl. No.: 12/034,265

(22) Filed: Feb. 20, 2008

(65) Prior Publication Data
US 2008/0311473 A1 Dec. 18, 2008

(30) Foreign Application Priority Data
Feb. 20, 2007 (JP) .................................. 2007-039592

(51) Int. Cl.
*H01M 4/131* (2010.01)
*H01M 4/525* (2010.01)
(Continued)

(52) U.S. Cl.
CPC ........... *H01M 4/525* (2013.01); *H01M 4/364* (2013.01); *H01M 4/485* (2013.01); *H01M 4/505* (2013.01);
(Continued)

(58) Field of Classification Search
USPC ................................................ 429/122–347
See application file for complete search history.

(56) References Cited

U.S. PATENT DOCUMENTS

| 6,551,744 B1 * | 4/2003 | Ohzuku et al. ............... 429/223 |
| 2002/0076613 A1 * | 6/2002 | Lee et al. .................... 429/231.1 |

(Continued)

FOREIGN PATENT DOCUMENTS

| JP | 5-242891 | 9/1993 |
| JP | 9-55210 | 2/1997 |

(Continued)

OTHER PUBLICATIONS

Machine Translation of JP 2000-223111 originally published Aug. 2000 to Kitahara et al.*

(Continued)

*Primary Examiner* — Jonathan G Leong
(74) *Attorney, Agent, or Firm* — Finnegan, Henderson, Farabow, Garrett & Dunner LLP (57) ABSTRACT

The present invention provides a cathode active material that makes possible a high capacity nonaqueous electrolyte secondary battery that has excellent discharge load characteristics that provide both good cycle characteristics and thermal stability. The cathode active material comprises a lithium nickel composite oxide having the compositional formula $LiNi_{1-a}M_aO_2$ (where, M is at least one kind of element that is selected from among a transitional metal other than Ni, a group 2 element, and group 13 element, and $0.01 \leq a \leq 0.5$) to which fine lithium manganese composite oxide particle adhere to the surface thereof. This lithium nickel composite oxide is obtained by adding manganese salt solution to a lithium nickel composite oxide slurry, causing manganese hydroxide that contains lithium to adhere to the surface of the lithium nickel composite oxide particles, and then baking that lithium nickel composite oxide.

12 Claims, 3 Drawing Sheets

(51) Int. Cl.
    *H01M 4/36*     (2006.01)
    *H01M 4/485*     (2010.01)
    *H01M 4/505*     (2010.01)
    *H01M 10/052*     (2010.01)
    *H01M 4/02*     (2006.01)

(52) U.S. Cl.
    CPC .... *H01M 10/052* (2013.01); *H01M 2004/028* (2013.01); *Y02E 60/122* (2013.01); *Y02P 70/54* (2015.11)

(56) References Cited

U.S. PATENT DOCUMENTS

2003/0068561 A1*   4/2003   Okahara et al. .............. 429/326
2003/0073004 A1*   4/2003   Kweon et al. ........... 429/231.95
2004/0161668 A1*   8/2004   Maeda et al. .............. 429/231.3

FOREIGN PATENT DOCUMENTS

JP     2000223111 A  *  8/2000
JP     2002-231227     8/2002
JP     2006-9659     1/2006

OTHER PUBLICATIONS

Arai et al., Electrochemical and Thermal Behavior of LiNiMO2 (M=Co, Mn, Ti), Sep. 1997, J. Electrochem. Soc., vol. 144, No. 9, pp. 3117-3125.*

* cited by examiner

CATHODE ACTIVE MATERIAL FOR A NONAQUEOUS ELECTROLYTE SECONDARY BATTERY AND MANUFACTURING METHOD THEREOF, AND A NONAQUEOUS ELECTROLYTE SECONDARY BATTERY THAT USES CATHODE ACTIVE MATERIAL

BACKGROUND OF THE INVENTION

This invention relates to a nonaqueous electrolyte secondary battery, and more particularly to cathode active material for a nonaqueous electrolyte secondary battery and the manufacturing method thereof.

Recently, consumer electronic devices are rapidly becoming more portable and cordless, and as the power supply for driving these electronic devices, there is a high demand for secondary batteries that are compact, lightweight and have a high energy density. From this aspect, there is large expectation and a rush for development for a nonaqueous electrolyte secondary battery, and particularly a lithium secondary battery having high energy density.

A nonaqueous electrolyte secondary battery comprises a cathode, an anode and a separator that is located between them, where a microporous membrane made mainly of polyolefin is used for the separator. An aprotic organic solvent, in which a lithium salt such as $LiBF_4$, $LIPF_6$ or the like is dissolved, is used as the nonaqueous electrolyte.

Recently, a battery that contains a lithium composite oxide as a cathode active material, and contains a carbon material, silicon compound, tin compound or the like as the anode material is attracting much attention as a lithium secondary battery having high energy density. A lithium oxide, for example, lithium cobalt oxide ($LiCoO_2$), which has a high electric potential with respect to lithium, is very safe and can be combined relatively easily, is being used as the lithium composite oxide.

Also, in order to avoid the problem of Cobalt resources, and from the aspect of even higher capacity, much testing is being performed for using lithium nickel oxide ($LiNiO_2$). There are abundant resources of nickel, and besides being able to be manufactured at low cost, lithium nickel oxide is also very suitable for high capacity. However, the crystal thermal stability of lithium nickel oxide having high capacity is low, and there is a problem with its cycle characteristics and high temperature storage characteristics. Therefore, materials such as the following have been proposed.

In Japanese Patent Application Publication No. H5-242891, doping lithium nickel oxide with cobalt and aluminum is disclosed from the aspect of improving the thermal stability of the lithium nickel oxide. However, in regards to the thermal stability, a certain amount of improvement is seen, however, in regards to the cycle characteristics and high temperature storage characteristics, adequate characteristics are not obtained.

Also, in H. Arai et al., J. of Electrochem. Soc., 144 (1997) 3117 a method is disclosed of improving the thermal stability by substituting nickel with cobalt, manganese or titanium. However, in this method of substitution, there is a problem in that the capacity of the secondary battery is decreased.

On the other hand, in H. J. Kweon et al., Electrochem. And Solid-State lett., 3 (2000) 128, a method is disclosed for improving the thermal stability by coating the surface of lithium nickel cobalt oxide with magnesium oxide. However, magnesium oxide is not an active material, so that coating reduces the charge and discharge capacity of the cathode active material.

Also, in Japanese Patent Application Publication No. H9-55210 a coating process is disclosed in which the surface of composite oxide particles that are represented by $LiNi_xM_yO_2$ (where M represents at least one kind of element that is selected from among Al, Ni, Co, Cr, Ti, Zn, P and B, and $0<x\leq1$, $0\leq y\leq1$) is covered by a compound that contains cobalt, aluminum or manganese. However, when the surface is covered with a compound, there is a concern that the specific surface area of the cathode active material is decreased, the contact between the active material and the electrolyte is reduced, the dispersion of the lithium is hindered, and the battery capacity is reduced, also the processing time of the disclosed method of manufacture is long and cannot be used as an industrial method. Moreover, only an example of using metallic alkoxide as the compound was given, however, there is a problem in that after processing there is residual carbon, and it combines with lithium to generate lithium carbonate, and as an impurity it causes internal resistance in the battery.

Furthermore, in Japanese Patent Application Publication No. 2002-231227, a method is disclosed in which the surface of a layered oxide for the cathode of a lithium secondary battery is coated with a lithium transition metal oxide. In this technique, the raw material solution for surface processing is adjusted to a pH of 5 to 9 and a solution density of 0.1 to 2 moles and a layered oxide is added, and using the Gel-Sol method, lithium transition metal oxide is adhered to that layered oxide. After coating, by performing heat treatment of the layered oxide at 500 to 850° C. for 3 to 48 hours, a cathode active material that is made from a layered oxide whose surface is coated with a lithium transition metal oxide is obtained. However, the manufacturing method has problems in that there is a large number of processes, the industrial cost is high, the viscosity of the slurry is high, a surplus of impurities remains on the surface of the cathode active material, dispersion of lithium is hindered, and the charging and discharging capacity of the cathode active material is decreased. Also, the raw material solution for surface treatment is adjusted to a pH of 5 to 9, however, there is a possibility that lithium will elute out from the layered oxide and there will be insufficient lithium in the layered structure, so there is concern that the battery capacity will decrease. Furthermore, there are examples of using $LiMn_{2-x}M1_xO_4$, $LiCo_{1-x}Al_xO_2$, $LiNi_{1-x}Al_xO_2$, $LiNi_{1-x-y}Co_xAl_yO_2$, $LiNi_{1-x-y-z}Co_xM1_yM2_zO_2$ (where M1 and M2 are Al, Ni, Co, Fe, Mn, V, Cr, Cu, Ti, W, Ta, Mg or Mo, and $0\leq x<0.5$, $0\leq y<0.5$, $0\leq z<0.5$), however, even though these are oxides having movable lithium ions, when using the cathode active material, the charging and discharging capacity decreases about 8%. Therefore, in the case of this proposal as well, it is difficult to say that the both the problems of high capacity and safety are satisfied.

As described above, in regards to improving a cathode active material that uses lithium nickel oxide, it is a fact that there are no effective measures that provide both thermal stability and cycle characteristics without losing the advantage of high capacity that lithium nickel oxide intrinsically has.

[Patent Document 1]
Japanese Patent Application Publication No. H5-242891
[Patent Document 2]
Japanese Patent Application Publication No. 2006-201779
[Patent Document 3]
Japanese Patent Application Publication No. H9-55210

[Patent Document 4]
Japanese Patent Application Publication No. 2002-231227
[Non-Patent Document]
H. Arai et al., J. of Electrochem. Soc., 144 (1997) 3117
[Non-Patent Document]
H. J. Kweon et al., Electrochem. And Solid-State lett., 3 (2000) 128

SUMMARY OF THE INVENTION

Taking into consideration the prior problems described above, it is the object of the present invention to provide both cycle characteristics and thermal stability while at the same time maintaining the characteristic of high charge and discharge capacity for lithium oxide that is used as cathode active material for a nonaqueous electrolyte secondary battery.

The cathode active material for a nonaqueous secondary battery of this invention comprise a lithium nickel composite oxide that is represented by the compositional formula $LiNi_{1-a}M_aO_2$; wherein M in the formula is at least one kind of element selected from among a transitional metal other than Ni, a group 2 element and group 13 element, 'a' is within the range $0.01 \leq a \leq 0.5$, and fine particles of lithium manganese composite oxide adhere to the surface of the lithium nickel composite oxide.

It is preferred that the element M includes at least one element from among Co, Al and Ti.

Also, it is preferred that the atomic ratio (Mn coating ratio) between the Mn in the lithium manganese composite oxide and the Ni and element M in the lithium nickel composite oxide be 0.003 to 0.02.

Furthermore, it is preferred that the lithium manganese composite oxide adhere to the surface of the lithium nickel composite oxide as an aggregate of needle shaped and/or plate shaped minute particles.

Particularly, it is preferred that the lithium manganese composite oxide cover the surface of the lithium nickel composite oxide as an aggregate of needle shaped and/or plate shaped minute particles. The covering in this invention is a state in which the aforementioned aggregate adheres to the entire surface of the lithium nickel composite oxide so that none of the lithium nickel composite oxide is exposed.

The nonaqueous electrolyte secondary battery of this invention uses the cathode active material for a nonaqueous electrolyte secondary battery of this invention.

The cathode active material for a nonaqueous electrolyte secondary battery of this invention is obtained by, suspending a lithium nickel composite oxide in a solvent to obtain a slurry, adding a solution, in which a manganese salt is dissolved, to the slurry, adhering manganese hydroxide that contains lithium to the surface of the particles of lithium nickel composite oxide, and baking the lithium nickel composite oxide to which manganese hydroxide that contains lithium adheres to the surface thereof.

It is preferred that at least one from among nitrate salt, sulfate salt, chloride salt and acetate salt be used as the manganese salt.

Also, it is preferred that a lithium compound be added to the solvent beforehand, and that a lithium nickel composite oxide be suspended in the solvent in which that lithium compound has been added.

In this case, it is preferred that a solution in which the manganese salt is dissolved be added to the solvent so that the atomic ratio (D(s)) between the Mn in the lithium manganese composite oxide and the Ni and element M in the lithium nickel composite oxide becomes 0.003 to 0.02, and that an amount of the lithium compound be added to the solvent to satisfy the reaction formula $MnSO_4 + 2tLiOH \rightarrow tMn(OH)_2 + (1-t)MnSO_4 + tLi_2SO_4$ ($0 < t \leq 1.2$).

Furthermore, it is preferred that the baking be performed at a temperature of 400 to 600° C. for 3 to 10 hours in an atmosphere of oxygen or air.

Effect of the Invention

With the present invention, a cathode active material for a nonaqueous electrolyte secondary battery that has high charging and discharging capacity as well as provides both good cycle characteristics and thermal stability is provided, and by using that cathode active material for a cathode, a nonaqueous electrolyte secondary battery is obtained in which these characteristics are reflected, and that has excellent discharge load characteristics, so the present invention is very useful industrially.

DESCRIPTION OF THE PREFERRED EMBODIMENTS

Generally, when a lithium nickel composite oxide is used as the cathode active material of a secondary battery, charging and discharging is performed by the desorption of lithium ions from or adsorption of lithium ions into that crystal structure. Normally, in the case of pure lithium nickel oxide that is not replaced by a metallic element, the phase transition of the crystal structure due to the change in volume during charging or discharging in the charge/discharge cycle is rapid, so cracking occurs in the particles, or large spaces occur at the particle boundaries.

Also, the thermal stability of lithium nickel composite oxides, particularly during charging, is inferior to lithium cobalt oxide or lithium manganese oxide. For example, when a lithium nickel composite oxide is used as cathode active material, it is known from differential scanning calorimeter (DCS) analysis of cathode active material in the overcharged state that very extreme heat near 210° C. will be generated instantaneously. This is considered to be due to oxidation and decomposition of the electrolyte that occurs due to the release of oxygen accompanying the breakdown of the crystal structure that is triggered by instability of the crystal structure that occurs when lithium ions are desorbed from the crystal structure of the lithium nickel oxide, and the promotion of a reaction between the electrolyte and oxygen that is released, which occurs at this time when the electrolyte comes in contact with the particles of lithium nickel composite oxide and oxygen is released with the nickel acting as a catalyst.

In regards to the instability of the crystal structure, it is known that stability can be improved by making a solid solution by replacing part of the nickel with aluminum or the like that is effective in stabilizing the crystal structure.

For example, in Japanese Patent Application Publication No. 2006-201779 by the inventors, cathode active material for a nonaqueous electrolyte secondary battery is disclosed which is made from a lithium nickel composite oxide that is obtained from a sintered powder having the compositional formula $LiNi_{1-a}M_aO_2$ (in the formula, M is an element that is selected from a transition metal element other than Ni, a group 2 element, or group 13 element, where $0.01 \leq a \leq 0.5$) that is washed in water and dried, where the specific surface area of the sintered lithium nickel composite oxide after washing is 0.3 to 2.0 $m^2/g$. A feature of this invention is improving the thermal stability by controlling the true specific surface area of the lithium nickel composite oxide powder of the cathode active material.

However, even though an improvement in thermal stability is seen, the invention is not sufficient in satisfying both improvement of thermal stability and prevention of a decrease in charging and discharging capacity of the secondary battery, and this problem becomes particularly noticeable in the case of a cylindrical battery under conditions of a severe temperature environment.

In order to improve the cathode active material, it is necessary that the surface of the lithium nickel composite oxide be such that it does not come in direct contact with the electrolyte. However, hindering the dispersion of lithium and causing a decrease in the charging and recharging capacity by coating the surface of the lithium nickel composite oxide as was done conventionally must be avoided.

Therefore, as the result of various investigation, the inventors of the present invention were able to complete the invention by gaining knowledge of how to first, reduce contact between the lithium nickel oxide particles and nonaqueous electrolyte, and dramatically suppress the reaction between a cathode active material and a nonaqueous type electrolyte by adhering minute particles made from a lithium manganese composite oxide to the surface of a lithium nickel composite oxide, and second, to prevent a decrease in the electrical capacity by also including lithium in the manganese oxide that adheres to the surface of the lithium nickel composite oxide, and adsorbing and desorbing lithium ions.

In other words, the cathode active material for a nonaqueous electrolyte secondary battery is made by adhering minute lithium manganese composite oxide to the surface of a lithium nickel composite oxide that is represented by the compositional formula $LiNi_{1-a}M_aO_2$ (in the formula, M is at least one element that is selected from a transition metal element other than Ni, a group 2 element and group 13 element, where $0.01 \leq a \leq 0.5$).

The reason that M is at least one element that is selected from among a transition metal other than Ni, a group 2 element and group 13 element is to improve the thermal stability by replacing Ni with these, and in order to stabilize the crystal and improve cycle characteristics of the battery, and typically in addition to Co, Al and Ti, Mn, Nb, Mg and Ga can be used.

However, from the aspect of improving the thermal stability, it is preferred that at least one or more of Co, Al and Ti be included in M.

Also, the reason for regulating the range for 'a' to $0.01 \leq a \leq 0.5$ is that when 'a' is less then 0.01, the effect for improving the thermal stability is not sufficient, however, when 'a' is greater than 0.5, the charging and discharging capacity of the cathode active material of the secondary battery decreases.

It is preferred that the Mn coating ratio D(s), which is the atomic ratio between the Mn in the lithium manganese composite oxide and the elements other than the Mn in the lithium nickel composite oxide, or in other words the Ni and element M (Mn/Ni+M), be 0.003 to 0.02. When D(s) is less than 0.003, the effect for reducing contact with the nonaqueous electrolyte is not sufficient, and when D(s) is greater than 0.02, the resistance due to the adhering of minute lithium manganese composite oxide particles becomes high, so the electrical capacity of cathode active material that is used for a secondary battery decreases.

It is preferred that the lithium manganese composite oxide that adheres to the surface be an aggregate of needle shaped and/or plate shaped minute particles. Also, it is preferred that the lithium manganese composite oxide cover the surface of the lithium nickel composite oxide, and more preferably that the covering is uniform. The needle shaped and/or plate shaped minute particles are needle shaped minute particles, plate shaped minute particles, and minute particles having a similar shape as these.

By using an aggregate of needle shaped and/or plate shaped minute particles, the specific surface area of the cathode active material is increased, and there is sufficient contact between the electrolyte and the lithium manganese composite oxide, so the migration of lithium ions is not hindered. Also, by adhering lithium manganese composite oxide to the surface of the lithium nickel composite oxide, it is possible to suppress the reaction between the electrolyte and the lithium nickel composite oxide. Moreover, by covering the surface of the lithium nickel composite oxide with lithium manganese composite oxide uniformly, it is possible to greatly suppress the reaction between the electrolyte and the lithium nickel composite oxide. In this way, with the cathode active material of this invention, it is possible to ensure the migration of lithium ions while at the same time greatly suppress the reaction between the electrolyte and lithium nickel composite oxide, and thus it is possible to realize both high capacity and good thermal stability.

Next, the method for manufacturing the cathode active material for the nonaqueous electrolyte secondary battery of this invention will be explained.

[First Process]

Preparation of the Lithium Nickel Composite Oxide

The method for preparing the lithium nickel composite oxide that is represented by the compositional formula $LiNi_{1-a}M_aO_2$ is not particularly limited, however includes the process described below.

A nickel composite hydroxide or nickel composite oxyhydroxide that contains Ni as the main component and element M as a sub component is prepared. When doing this, the raw materials are mixed so that ratio of Ni and M in the lithium nickel composite oxide that is represented by the compositional formula $LiNi_{1-a}M_aO_2$ is $0.01 \leq a \leq 0.5$. The method for preparing the nickel composite hydroxide or nickel composite oxyhydroxide is not particularly limited, however, it is preferred that a coprecipitation method be used in which alkali aqueous solution is poured into the raw material aqueous solution in which the nickel compound and element M compound are dissolved, and hydroxide or oxyhydroxide is precipitated out.

The obtained hydroxide or oxyhydroxide is roasted under atmospheric conditions at a temperature of 600 to 1100° C. to produce a nickel composite oxide containing Ni as the main component and the element M as a sub component.

After mixing the prepared nickel composite oxide and lithium compound, a lithium nickel composite oxide powder that is represented by the compositional formula $LiNi_{1-a}M_aO_2$ ($0.01 \leq a \leq 0.5$) is prepared by baking.

[Second Process]
Manganese Solution Processing

A manganese solution is prepared by dissolving manganese salt in a solvent. Manganese sulfate, manganese nitrate, manganese chloride, manganese acetate or the like can be used as the manganese salt. These can be used alone or as a combination. Of these, it is particularly preferred that manganese sulfate be used. This is because, with manganese chloride, there is a possibility that residual chlorine will affect the cycle characteristics of the battery, with manganese acetate there is a concern that gas will be generated during the cycle due to the effect of lithium carbonate that is created by the residual carbon, and with manganese nitrate there is a concern that corrosion of the device will occur due to NOx that is generated during baking.

Ion-exchange water or water soluble alcohol can be used as the solvent for the manganese solution, however, it is preferred that ion-exchange water, which is affected little by residual carbon, be used.

The density of the dissolved manganese does not especially need to be specified, however, it is preferred that in order that the reaction in this second process be uniform, the density be 0.2 to 2.0 mol/L.

Next, a specified amount of the prepared manganese solution is added to a slurry of which lithium nickel composite oxide is suspended in a solvent, and the surface of the lithium nickel composite oxide is covered by the manganese hydroxide.

Similarly, ion-exchange water or water soluble alcohol can be used as the slurry solvent, however, it is preferred that ion-exchange water be used because it is difficult for carbon to remain as an impurity after the surplus lithium, such as lithium sulfate, that exists on the surface of the lithium nickel composite oxide is removed.

By increasing the pH of the slurry by eluting out the aforementioned surplus lithium, the manganese hydroxide that contains lithium crystallizes on the surface of the lithium nickel composite oxide. When this happens, depending on the crystallization condition, there may be a fine mixture of lithium hydroxide and manganese hydroxide, but it is not a problem. When crystallization is not adequate, the pH can be adjusted by adding the alkali source.

It is preferred that the pH during crystallization be greater than 9 and less than or equal to 13.5. By using this kind of pH range, it is possible to form an aggregate of needle shaped and/or plate shaped minute particles of manganese hydroxide that contains lithium that crystallize on the surface, and after baking, that form is maintained. When the pH during crystallization is 9 or less, the amount of lithium that is desorbed from the lithium nickel composite oxide becomes large, the battery capacity is decreased, and the hydroxide that crystallizes becomes rough, so the battery capacity decreases further. When the pH during crystallization is adjusted so that it exceeds 13.5, the effect is not improved.

Also, before suspending the lithium nickel composite oxide, it is preferred that a lithium compound that is selected from among lithium hydroxide, lithium carbonate, and lithium oxalate be added to the solvent. Lithium hydroxide monohydrate is stable and easy to handle and does not contain any harmful carbon, so it is particularly preferred.

Even in the case where no lithium compound is added, it is possible to include lithium in the manganese hydroxide that is crystallized on the surface from the elute of surplus lithium on the surface, and furthermore, by adding lithium compound, it is possible to obtain a manganese composite oxide from baking that contains enough lithium to cause adsorption and desorption of lithium ions.

It is preferred that just an amount of lithium compound be added to the solvent so that the reaction formula $MnSO_4 + 2tLiOH \rightarrow tMn(OH)_2 + (1-t)MnSO_4 + tLi_2SO_4$ ($0 < t \leq 1.2$) is satisfied. By adding this amount of lithium hydroxide, it is possible to supply the necessary alkali source for generating manganese hydroxide that contains lithium, and it is possible to uniformly crystallize this manganese hydroxide that contains lithium on the surface of the lithium nickel composite oxide to cover the surface.

It is preferred that the lithium composite oxide slurry be adjusted to 1500 to 2500 g/L if it can be stirred.

The precipitation speed of the manganese hydroxide onto the lithium nickel composite oxide is fast, so it is preferred that the speed at which the manganese salt solution is added to the slurry be constant. Also, in order to uniformly disperse the manganese salt into the reaction solution, it is preferred that the amount of manganese salt solution per 1 kg of lithium composite oxide be added at a rate of 4.5 to 9.0 kg/h.

Moreover, it is preferred that the reaction temperature be 10 to 40° C. When the reaction temperature is less than 10° C., there is a possibility that the necessary amount of lithium for adjusting the pH cannot be dissolved, and that the reaction will not be uniform. When the reaction temperature exceeds 40° C., the amount of lithium dissolved in the solution increases, and the precipitation of just lithium from the lithium nickel composite oxide becomes intense, and there is a possibility that the charging and discharging capacity of the secondary battery will decrease.

Any method can be used for filtering the slurry after the reaction, however, it is preferred that a suction filter or a filter press be used.

[Third Process]
Baking

The lithium nickel composite oxide to which manganese hydroxide that contains lithium is adhered to the surface thereof is dried and then baked in oxygen or in air. It is preferred that drying after draining be performed in a vacuum. In order to remove all of the water, it is preferred that the drying temperature be 100° C. or greater, and more preferably 120 to 210° C.

Baking is performed in an oxidizing atmosphere. For example, the oxidizing atmosphere can be air or oxygen, however, oxygen is preferred. It is preferred that the baking temperature be greater than or equal to 450° C. and less than or equal to 550° C. The baking time can vary according to the baking temperature, but it is preferred that the baking time be 3 to 10 hours.

With the method described above, it is easy to obtain cathode active material that is made from lithium nickel composite oxide to which lithium manganese composite oxide is adhered to the primary particles thereof, in which the average particle radius of the primary particles of the lithium nickel composite oxide is greater than or equal to 1 μm and less than or equal to 3 μm, the average particle radius of the secondary particles is greater than or equal to 8 μm and less than or equal to 20 μm.

Figure 1:
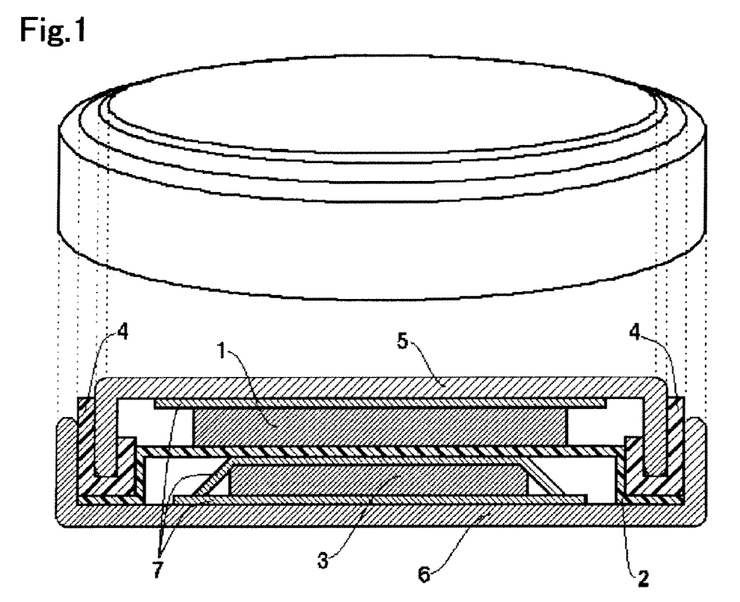
FIG. 1 is a drawing showing the construction of a coin battery that was used when performing a charging and discharging test.

The feature of the nonaqueous electrolyte secondary battery of this invention is the cathode active material, and the other components are not particularly limited. A basic structure of such an nonaqueous electrolyte secondary battery is outlined below referring FIG. 1 showing an example of 2032 type coin battery. The 2032 type coin battery comprises an anode (negative electrode) 1, a cathode (positive electrode) 3, and a separator 2 placed between the anode 1 and the cathode 3 and impregnated with an electrolyte, in which the above elements are entirely covered by an anode can body 5 from the anode side and by a cathode can body 6 from the cathode side, and a gasket 4 is placed between the anode can body 5 and the cathode can body 6 so as to prevent short circuit between the anode can body 5 and the cathode can body 6 from occurring and shield the inside from the outside. The 2032 type coin battery also comprises a collector 7.

The cathode 3 normally comprises a cathode core material and cathode mixture that is supported by the core material. In addition to cathode active material, the cathode mixture can include a binding agent, conductive agent or the like. It is preferred that fluorine resin such as polyvinylidene-fluoride or polytetrafluoroethylene, or rubber particles such as modified acrylonitrile rubber be used as the binding agent, however it is not limited to these. Also, it is preferred that carbon black such as acetylene black, ketjen black, or various forms of graphite be used as the conductive agent, however, similarly is not limited to these.

The anode 2 normally comprises an anode core and an anode mixture that is supported by the core. The anode mixture typically includes anode active material and a binding agent, and may include a conductive agent when necessary. Carbon material such as various forms of natural graphite or various forms of artificial graphite, composite material that includes silicon such as silicide, or various alloy materials can be used as the anode active material. It is preferred that a fluorine resin such as polyvinylidene-fluoride or modified polyvinylidene-fluoride, or rubber particles such as styrene-butadiene rubber be used as the binding agent, however it is not limited to these. The same material that is used for the cathode 3 can be used for the conductive agent.

Generally, the separator is a microporous film made from a polyolefin resin such as polyethylene or polypropylene, however, it is not limited to these. Also, the microporous film can be a single-layer film made from one kind of polyolefin resin, or can be a multi-layered film made from two or more kinds of polyolefin resin.

A nonaqueous solvent in which lithium salt is dissolved is used as the nonaqueous electrolyte. Ethylene carbonate, propylene carbonate, dimethyl carbonate, diethyl carbonate, ethyl methyl carbonate, γ-butyrolactone can be used as the nonaqueous solvent, however it is not limited to these. It is preferred that a combination of two or more be used as the nonaqueous solvent. It is preferred that lithium hexafluoro-phosphate ($LiPF_6$), lithium quadrafluoroborate ($LiBF_4$) be used as the lithium salt, however it is not limited to these. It is preferred that the nonaqueous electrolyte include vinylene carbonate, cyclohexylamine benzene, diphenyl ether or the like as an additive.

The present invention will be further explained based on the examples, however the invention is not limited to these examples.

EXAMPLES

Example 1

First Process

Preparing the Lithium Nickel Composite Oxide

Lithium nickel composite oxide that is represented by the compositional formula $Ni_{0.82}Co_{0.15}Al_{0.03}Li_{1.02}O_2$ was prepared according to the method described below.

First, nickel sulfate hexahydrate (Wako Pure Chemical Industries, Ltd.), cobalt sulfate heptahydrate (Wako Pure Chemical Industries, Ltd.) and aluminum sulfate (Wako Pure Chemical Industries, Ltd.) were weighed to the desired proportions, and mixed, then were dissolved in ion-exchange water to obtain the raw material aqueous solution. This raw material aqueous solution was dripped into a stirring reaction tank with a discharge opening which contained water and which was kept at 50° C. simultaneously with specified proportions of ammonia water (Wako Pure Chemical Industries, Ltd.) and caustic soda water solution. The pH was kept at 11.5 and the retention time was 11 hours, and by the reaction crystallization method, spherical shaped nickel hydroxide in which primary particles were aggregated was obtained. Next, the spherical shaped nickel hydroxide was roasted for 10 hours at a roasting temperature of 600° C., to obtain nickel oxide.

Furthermore, lithium hydroxide monohydrate (Wako Pure Chemical Industries, Ltd.) was added to the nickel oxide to obtain the desired composition, and mixed with a V blender. The obtained mixture was then interim baked at 500° C. for 3 hours in an oxygen atmosphere using an electric heater (Koyo Thermo Systems Co., Ltd, 51000 tabletop box heater), after which it was baked at 765° C. for 20 hours. Next, the inside of the heater was cooled to room temperature, after which pulverizing was performed using a pin mill (Hosokawa Micron Corporation) to obtain lithium nickel composite oxide that is represented by the compositional formula $Ni_{0.82}Co_{0.15}Al_{0.03}Li_{1.02}O_2$. That lithium nickel composite oxide was spherical shaped baked powder comprising secondary particle to which the primary particles were aggregated.

Second Process

Manganese Solution Processing

In order that the Mn coating ratio becomes D(s)=0.008, 88.4 g of manganese sulfate 1.5 hydrate (Wako Pure Chemical Industries, Ltd.) was added to 682 ml of ion-exchange water and mixed to obtain 40 g/L of manganese sulfate solution.

2400 ml of ion-exchange water was adjusted to 19° C., and 42 g of lithium hydroxide monohydrate (Wako Pure Chemical Industries, Ltd.) was added and mixed so that in the reaction formula $MnSO_4+2tLiOH \rightarrow tMn(OH)_2+(1-t)MnSO_4+tLi_2SO_4$, t=1.0, to create an aqueous solution having a pH of 11.9. After that, 6.0 kg of the prepared lithium nickel composite oxide was put into the obtained aqueous solution to obtain a slurry having an initial slurry density of 2.5 kg/L.

Next, the prepared manganese sulfate aqueous solution was dripped while mixing into the 1.0 kg of nickel composite oxide containing lithium at a speed of 4.5 kg/h, and then dripped into the slurry, after which the slurry was filtered using a suction filter to obtain lithium nickel composite oxide that was covered by manganese hydroxide having a water content of 10.9%.

Third Process

Baking

The lithium nickel composite oxide that was covered with manganese hydroxide that contains lithium was dried at 150° C. for 14 hours using a fixed type vacuum drier (Toyo Engineering Works, Model VO-420). Next, the dried material was baked at 500° C. for 10 hours in an oxygen atmosphere using a continuous type sintering furnace (Sun Furnace Co., Ltd, fully automatic pusher type continuous sintering furnace) to obtain a cathode active material that was covered with manganese composite oxide having a Mn coating ratio D(s)=0.008.

Figure 2:
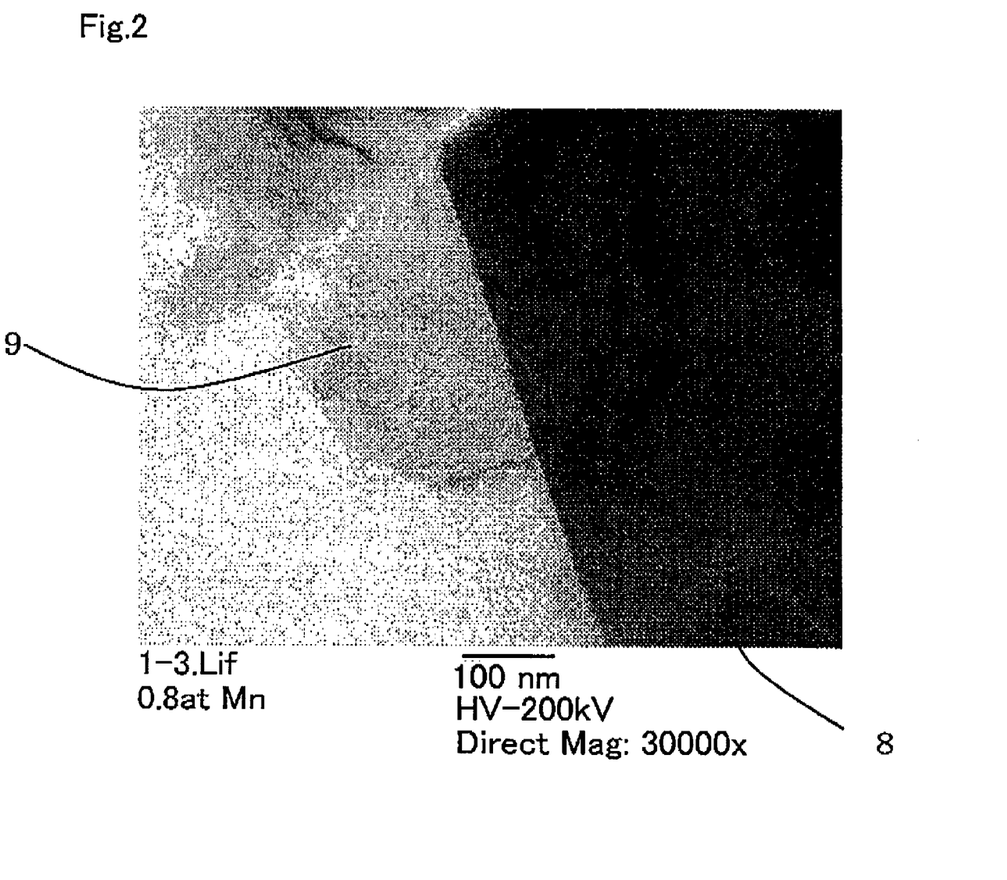
FIG. 2 is a cross-sectional photograph (TEM image) of cathode active material that is obtained in Example 1.
Figure 3:
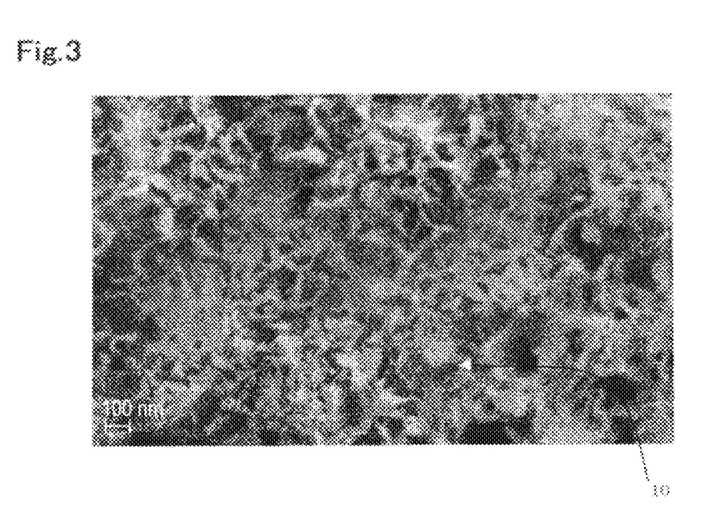
FIG. 3 is a photograph (low-speed Schottky-SEM image) of the surface of the cathode active material obtained in Example 1.

A photograph by a transmission electron microscope (TEM) of the cross section of the obtained cathode active material is shown In FIG. 2. Also, a photograph (low speed Schottky-SEM image) of the surface of that cathode active material is shown in FIG. 3. It was confirmed that the surface of the lithium nickel composite oxide 8 as cathode active material was covered by the lithium manganese composite oxide 9 from FIG. 2, and this lithium manganese composite oxide 9 is composed of microscopic particles 10 having a needle shape and/or a plate shape and an aggregate of minute needle shaped and/or plate shaped particles 10 covering the active material 8.

Fourth Process

Creation and Evaluation of a Nonaqueous Electrolyte Secondary Battery

The initial discharge capacity of the obtained cathode active material was evaluated as described below. A 2032 type coin battery as shown in FIG. 1 was made in an Ar glove box with a dew point controlled at −80° C. A mixture of 70% weight of active material powder, 20% weight acetylene black and 100/0 weight polytetrafluoroethylene (PTFE) was formed, and from that, 150 mg was weighed and made into a pellet to form a cathode 3.

Lithium metal was used as the anode 1. Also, a solution of ethylene carbonate (Ee) and diethyl carbonate (DEC) mixed in equal amounts (Tomiyama Pure Chemical Industries, LTD.) with 1 mole of $LiClO_4$ as a supporting salt was used as the electrolyte.

The battery that was made was let to sit for about 24 hours, and after the open circuit voltage (OCV) became stable the cathode 3 as an evaluation electrode was charged to a cutoff voltage of 4.3 V with a current density 0.5 $mA/cm^2$ as the initial charging capacity, and after one hour rest, that capacity after being discharged to a cutoff voltage of 3.0V was taken to be the initial discharge capacity. The initial discharge capacity in this embodiment was 184.3 mAh/g.

The safety of the cathode 3 was evaluated by measuring the exothermal behavior using a differential scanning calorimeter (DSC, Rigaku Corporation, PTC-l0A). First, using the same method as used when evaluating the initial discharge capacity, the 2032 type coin battery was charged using constant current and constant voltage (CCCV) to a cutoff voltage of 4.3 V, and then being careful not to short circuit the battery, the battery was dismantled and the cathode 3 was removed. This electrode was weighed and 3.0 mg was taken to which 1.3 mg of electrolyte was added, after which it was placed in a 5.0 diameter aluminum measurement container and the exothermal behavior was measured using a DSC (MacScience, T1162-055) from room temperature to 400° C. at a rate of temperature increase of 10° C./min.

The maximum DSC output (calorific value) in this embodiment was 21 W/g, and the temperature that the exothermic peak was 286° C.

Example 2

Other than preparing the amount of manganese sulfate solution so that the Mn coating ratio becomes D(s)=0.005 in the second process, the cathode active material was obtained in the same way as in Example 1. Using SEM, it was confirmed that the surface of the obtained cathode active material was covered by an aggregate of needle shaped and/or plate shaped lithium manganese composite oxide.

After that, as a result of performing evaluation in the same way as was performed in Example 1, it was shown that the initial discharge capacity was 189.3 mAh/g, the maximum DSC output (calorific value) was 50 W/g and the exothermic peak temperature was 262° C.

Example 3

Other than preparing the amount of manganese sulfate solution so that the Mn coating ratio becomes D(s)=0.012 in the second process, the cathode active material was obtained in the same way as in Example 1. Using SEM, it was confirmed that the surface of the obtained cathode active material was covered by an aggregate of needle shaped and/or plate shaped lithium manganese composite oxide.

After that, as a result of performing evaluation in the same way as was performed in Example 1, it was shown that the initial discharge capacity was 178.3 mAh/g, the maximum DSC output (calorific value) was 19 W/g and the exothermic peak temperature was 295° C.

Example 4

Other than adding lithium hydroxide monohydrate so that t in the reaction formula becomes t=0.342 in the second process, the cathode active material was obtained in the same way as in Example 1. Using SEM, it was confirmed that the surface of the obtained cathode active material was covered by an aggregate of needle shaped and/or plate shaped lithium manganese composite oxide.

After that, as a result of performing evaluation in the same way as was performed in Example 1, it was shown that the initial discharge capacity was 182.2 mAh/g, the maximum DSC output (calorific value) was 22 W/g and the exothermic peak temperature was 285° C.

Example 5

Other than adding lithium hydroxide monohydrate so that t in the reaction formula becomes t=0.6 in the second process, and using a baking temperature of 400° C. in the third process, the cathode active material was obtained in the same way as in Example 1. Using SEM, it was confirmed that the surface of the obtained cathode active material was covered by an aggregate of needle shaped and/or plate shaped lithium manganese composite oxide.

After that, as a result of performing evaluation in the same way as was performed in Example 1, it was shown that the initial discharge capacity was 179.3 mAh/g, the maximum DSC output (calorific value) was 40 W/g and the exothermic peak temperature was 270° C.

Example 6

Other than using a baking temperature of 550° C. in the third process, the cathode active material was obtained in the same way as in Example 5. Using SEM, it was confirmed that the surface of the obtained cathode active material was covered by an aggregate of needle shaped and/or plate shaped lithium manganese composite oxide.

After that, as a result of performing evaluation in the same way as was performed in Example 1, it was shown that the initial discharge capacity was 176.5 mAh/g, the maximum DSC output (calorific value) was 13 W/g and the exothermic peak temperature was 300° C.

Example 7

Other than using a baking temperature of 500° C. and baking time of 5 hours in the third process, the cathode active material was obtained in the same way as in Example 5. Using SEM, it was confirmed that the surface of the obtained cathode active material was covered by an aggregate of needle shaped and/or plate shaped lithium manganese composite oxide.

After that, as a result of performing evaluation in the same way as was performed in Example 1, it was shown that the initial discharge capacity was 176.7 mAh/g, the maximum DSC output (calorific value) was 45 W/g and the exothermic peak temperature was 275° C.

Example 8

Other than adjusting the amount of manganese sulfate solution so that the Mn coating ratio $D(s)=0.003$ in the second process, the cathode active material was obtained in the same way as in Example 1. Using SEM, it was confirmed that an aggregate of needle shaped and/or plate shaped lithium manganese composite oxide adhered to part of the surface of the obtained cathode active material.

After that, as a result of performing evaluation in the same way as was performed in Example 1, it was shown that the initial discharge capacity was 190.1 mAh/g, the maximum DSC output (calorific value) was 57 W/g and the exothermic peak temperature was 260° C.

Example 9

Other than adjusting the amount of manganese sulfate solution so that the Mn coating ratio $D(s)=0.021$ in the second process, the cathode active material was obtained in the same way as in Example 1. Using SEM, it was confirmed that the surface of the obtained cathode active material was covered by an aggregate of needle shaped and/or plate shaped lithium manganese composite oxide.

After that, as a result of performing evaluation in the same way as was performed in Example 1, it was shown that the initial discharge capacity was 166.3 mAh/g, the maximum DSC output (calorific value) was 12 W/g and the exothermic peak temperature was 320° C.

Example 10

Other than not using lithium hydroxide in the second process, the cathode active material was obtained in the same way as in Example 1. Using SEM, it was confirmed that the surface of the obtained cathode active material was covered by an aggregate of needle shaped and/or plate shaped lithium manganese composite oxide.

After that, as a result of performing evaluation in the same way as was performed in Example 1, it was shown that the initial discharge capacity was 177.0 mAh/g, the maximum DSC output (calorific value) was 57 W/g and the exothermic peak temperature was 260° C.

Example 11

Other than using manganese nitrate hexahydrate as the manganese salt, and adjusting the amount of manganese sulfate solution so that the Mn coating ratio $D(s)=0.010$ in the second process, the cathode active material was obtained in the same way as in Example 10. Using SEM, it was confirmed that the surface of the obtained cathode active material was covered by an aggregate of needle shaped and/or plate shaped lithium manganese composite oxide.

After that, as a result of performing evaluation in the same way as was performed in Example 1, it was shown that the initial discharge capacity was 182.5 mAh/g, the maximum DSC output (calorific value) was 52 W/g and the exothermic peak temperature was 261° C.

Example 12

Other than using manganese chloride tetrahydrate as the manganese salt in the second process, the cathode active material was obtained in the same way as in Example 11. Using SEM, it was confirmed that the surface of the obtained cathode active material was covered by an aggregate of needle shaped and/or plate shaped lithium manganese composite oxide.

After that, as a result of performing evaluation in the same way as was performed in Example 1, it was shown that the initial discharge capacity was 181.7 mAh/g, the maximum DSC output (calorific value) was 50 W/g and the exothermic peak temperature was 260° C.

Example 13

Other than using manganese acetate tetrahydrate as the manganese salt in the second process, the cathode active material was obtained in the same way as in Example 11. Using SEM, it was confirmed that an aggregate of needle shaped and/or plate shaped lithium manganese composite oxide adhered to the surface of the obtained cathode active material.

After that, as a result of performing evaluation in the same way as was performed in Example 1, it was shown that the initial discharge capacity was 179.6 mAh/g, the maximum DSC output (calorific value) was 50 W/g and the exothermic peak temperature was 260° C.

Example 14

Other than using a baking temperature of 350° C. in the third process, the cathode active material was obtained in the same way as in Example 1. Using SEM, it was confirmed that the surface of the obtained cathode active material was covered by an aggregate of needle shaped and/or plate shaped lithium manganese composite oxide.

After that, as a result of performing evaluation in the same way as was performed in Example 1, it was shown that the initial discharge capacity was 177.0 mAh/g, the maximum DSC output (calorific value) was 60 W/g and the exothermic peak temperature was 260° C.

Example 15

Other than using a baking temperature of 650° C. in the third process, the cathode active material was obtained in the same way as in Example 1. Using SEM, it was confirmed that the surface of the obtained cathode active material was covered by an aggregate of needle shaped and/or plate shaped lithium manganese composite oxide.

After that, as a result of performing evaluation in the same way as was performed in Example 1, it was shown that the initial discharge capacity was 174.0 mAh/g, the maximum DSC output (calorific value) was 40 W/g and the exothermic peak temperature was 270° C.

Example 16

Other than adding 25 g of lithium hydroxide monohydrate so that t in the reaction formula becomes t=0.6 in the second process, and using a baking time of 2 hours in the third process, the cathode active material was obtained in the same way as in Example 1. Using SEM, it was confirmed that the surface of the obtained cathode active material was covered by an aggregate of needle shaped and/or plate shaped lithium manganese composite oxide.

After that, as a result of performing evaluation in the same way as was performed in Example 1, it was shown that the initial discharge capacity was 176.4 mAh/g, the maximum DSC output (calorific value) was 60 W/g and the exothermic peak temperature was 260° C.

Example 17

Other than using a baking time of 15 hours in the third process, the cathode active material was obtained in the same way as in Example 1. Using SEM, it was confirmed that the surface of the obtained cathode active material was covered by an aggregate of needle shaped and/or plate shaped lithium manganese composite oxide.

After that, as a result of performing evaluation in the same way as was performed in Example 1, it was shown that the initial discharge capacity was 171.3 mAh/g, the maximum DSC output (calorific value) was 13 W/g and the exothermic peak temperature was 300° C.

Comparative Example 1

The coating process was not performed on the lithium nickel composite oxide that was prepared in Example 1, and that composite oxide was used as the cathode active material. As a result of performing evaluation in the same way as was performed in Example 1, it was shown that the initial discharge capacity was 176.0 mAh/g, the maximum DSC output (calorific value) was 58 W/g and the exothermic peak temperature was 258° C.

TABLE 1

| | Mn raw material | Mn coating ratio D(s) | t | Baking conditions Temperature (° C.) | Time (h) | Initial discharge capacity (mAh/g) | Calorific value (W/g) | Exothermic peak temperature (° C.) |
|---|---|---|---|---|---|---|---|---|
| E1 | Manganese sulfate | 0.008 | 1.000 | 500 | 10 | 184.3 | 21 | 286 |
| E2 | Manganese sulfate | 0.005 | 1.000 | 500 | 10 | 189.3 | 50 | 262 |
| E3 | Manganese sulfate | 0.012 | 1.000 | 500 | 10 | 178.3 | 19 | 295 |
| E4 | Manganese sulfate | 0.008 | 0.324 | 500 | 10 | 182.2 | 22 | 285 |
| E5 | Manganese sulfate | 0.008 | 0.600 | 400 | 10 | 179.3 | 40 | 270 |
| E6 | Manganese sulfate | 0.008 | 0.600 | 550 | 10 | 176.5 | 13 | 300 |
| E7 | Manganese sulfate | 0.008 | 0.600 | 500 | 5 | 176.7 | 45 | 275 |
| E8 | Manganese sulfate | 0.003 | 1.000 | 500 | 10 | 190.1 | 57 | 260 |
| E9 | Manganese sulfate | 0.021 | 1.000 | 500 | 10 | 166.3 | 12 | 320 |
| E10 | Manganese sulfate | 0.008 | — | 500 | 10 | 177.0 | 57 | 260 |
| E11 | Manganese nitrate | 0.010 | — | 500 | 10 | 182.5 | 52 | 261 |
| E12 | Manganese chloride | 0.010 | — | 500 | 10 | 181.7 | 50 | 260 |
| E13 | Manganese acetate | 0.010 | — | 500 | 10 | 179.6 | 50 | 260 |
| E14 | Manganese sulfate | 0.008 | 1.000 | 350 | 10 | 177.0 | 60 | 260 |
| E15 | Manganese sulfate | 0.008 | 1.000 | 650 | 10 | 174.0 | 40 | 270 |
| E16 | Manganese sulfate | 0.008 | 0.600 | 500 | 2 | 176.4 | 60 | 260 |
| E17 | Manganese sulfate | 0.008 | 1.000 | 500 | 15 | 171.3 | 13 | 300 |
| CE1 | — | — | — | — | — | 176.0 | 58 | 258 |

(*E—Example, CE—Comparative example)

As shown in Table 1, the cathode active material that is obtained in Examples 1 to 17 is lithium nickel composite oxide that has excellent thermal stability, and by covering the surface thereof with a lithium manganese composite oxide, the contact with the electrolyte is reduced and the exothermic peak temperature is 260° C., making it a very safe material.

Particularly, the cathode active material of Examples 1 to 7 in which a manganese salt is added after the pH of the composite oxide particle slurry has been adjusted using lithium hydroxide, the initial discharge capacity is high and exceeds 175 mAh/g, and the exothermic peak temperature is also a high 260° C. or greater, making it capable for this material to be used instead of lithium cobalt oxide ($LiCoO_2$) as a new battery material.

On the other hand, in the case of the cathode active material of Comparative Example 1 that is not covered by lithium manganese composite oxide, the initial discharge capacity is a high 176 mAh/g, the calorific value is a high 58 W/g, and the exothermic peak temperature is less than 260° C., so is a material for which there is room for improving the safety thereof.

INDUSTRIAL APPLICABILITY

A nonaqueous electrolyte secondary battery that uses the cathode active material of this invention, which is very safe and has a high initial discharge capacity, is highly suitable for use as a power source for compact portable electronic devices that required high capacity.

Moreover, in the case of a power source for an electric automobile, it is difficult to maintain safety as the size of the battery increases, so in order to maintain a higher level of safety, there is a need for an expensive protective circuit, however, with this invention, safety of the power source is easily maintained, and since it is possible to lower costs by omitting the protective circuit, so the present invention is suitable for this use as well. This power source is also suitable for use in hybrid automobiles, so the nonaqueous electrolyte secondary battery of this invention can be suitably applied to a wide range of applications.

What is claimed is:

1. A cathode active material for a nonaqueous secondary battery mainly comprising:
   a lithium nickel composite oxide that is represented by the compositional formula $LiNi_{1-a}M_aO_2$; wherein
   M is at least one kind of element selected from among a transitional metal other than Ni, a group 2 element and group 13 element;
   'a' is within the range $0.01 \leq a \leq 0.5$,
   the cathode active material further comprising fine particles of a manganese composite oxide that contains lithium, wherein the fine particles of the manganese composite oxide that contains lithium are needle shaped and/or plate shaped fine particles,
   wherein the lithium nickel composite oxide is composed of spherical shaped powder comprising secondary particles having an average particle radius of greater than or equal to 8 µm and less than or equal to 20 µm, each of the secondary particles formed with aggregated primary particles having an average particle radius of greater than or equal to 1 µm and less than or equal to 3 µm,
   wherein the fine particles of the manganese composite oxide that contains lithium adhere to a surface of the primary particles such that the fine particles adhere to a surface of the spherical shaped powder of the lithium nickel composite oxide as an aggregate, and
   wherein a manganese coating ratio D(s), which is an atomic ratio, (Mn/(Ni+M)), between Mn in the manganese composite oxide that contains lithium, and the Ni and the element M in the lithium nickel composite oxide, is 0.003 to 0.02.

2. The cathode active material for a nonaqueous electrolyte secondary battery of claim 1, wherein the cathode active material is obtained by adding a manganese solution to a slurry of which the lithium nickel composite oxide is suspended in a solvent keeping a pH of greater than 9 and less than or equal to 13.5 so that the fine particles of a manganese hydroxide that contains lithium is adhered to the surface of the spherical shaped powder of the lithium nickel composite oxide as an aggregate of needle shaped and/or plate shaped minute particles, and baking a lithium nickel composite oxide to which the fine particles of the manganese hydroxide that contains lithium is adhered at a temperature of 400 to 600° C. for 3 to 10 hours.

3. The cathode active material for a nonaqueous electrolyte secondary battery of claim 1, wherein the element M includes at least one element from among Co, Al and Ti.

4. The cathode active material for a nonaqueous electrolyte secondary battery of claim 1, wherein the fine particles of the manganese composite oxide that contains lithium uniformly covers the surface of the spherical shaped powder of the lithium nickel composite oxide.

5. A nonaqueous electrolyte secondary battery in which the cathode active material for a nonaqueous electrolyte secondary battery of any one of the claims 1, 2, 3, and 4 is used.

6. The nonaqueous electrolyte secondary battery of claim 5, wherein the battery is a 2032 type coin battery having an initial discharge capacity of 166.3 mAh/g or more.

7. A manufacturing method of the cathode active material for a nonaqueous electrolyte secondary battery of claim 1, comprising steps of:
   suspending a lithium nickel composite oxide in a solvent to obtain a slurry;
   adding a solution in which a manganese salt is dissolved to the slurry;
   adhering manganese hydroxide that contains lithium to the surface of the particles of lithium nickel composite oxide; and
   baking the lithium nickel composite oxide to which manganese hydroxide that contains lithium adheres to the surface thereof, to obtain a lithium nickel composite oxide to which lithium manganese composite oxide adheres to the surface thereof.

8. The manufacturing method of the cathode active material for a nonaqueous electrolyte secondary battery of claim 7, wherein
   at least one from among nitrate salt, sulfate salt, chloride salt and acetate salt is used as the manganese salt.

9. The manufacturing method of the cathode active material for a nonaqueous electrolyte secondary battery of claim 7, wherein manganese sulfate is used as the manganese salt.

10. The manufacturing method of the cathode active material for a nonaqueous secondary battery of claim 7, wherein a lithium compound is added to the solvent beforehand, and the lithium nickel composite oxide is suspended in the solvent in which the lithium compound has been added.

11. The manufacturing method of the cathode active material for a nonaqueous secondary battery of claim 10, wherein
   the solution in which the manganese salt is dissolved is added to the solvent so that the atomic ratio between the Mn in the lithium manganese composite oxide and the Ni and element M in the lithium nickel composite oxide becomes 0.003 to 0.02, and an amount of the lithium compound is added to the solvent to satisfy the reaction formula $MnSO_4 + 2tLiOH \rightarrow tMn(OH)_2 + (1-t)MnSO_4 + tLi_2SO_4$ ($0 < t \leq 1.2$).

12. The manufacturing method of the cathode active material for a nonaqueous secondary battery of any one of the claims 7 to 11, wherein the baking is performed at a temperature of 400 to 600° C. for 3 to 10 hours in an atmosphere of oxygen or air.

* * * * *